Nov. 29, 1966     F. A. LENNON ETAL     3,287,813
GAUGE FOR COUPLING COMPONENTS
Filed Dec. 4, 1961
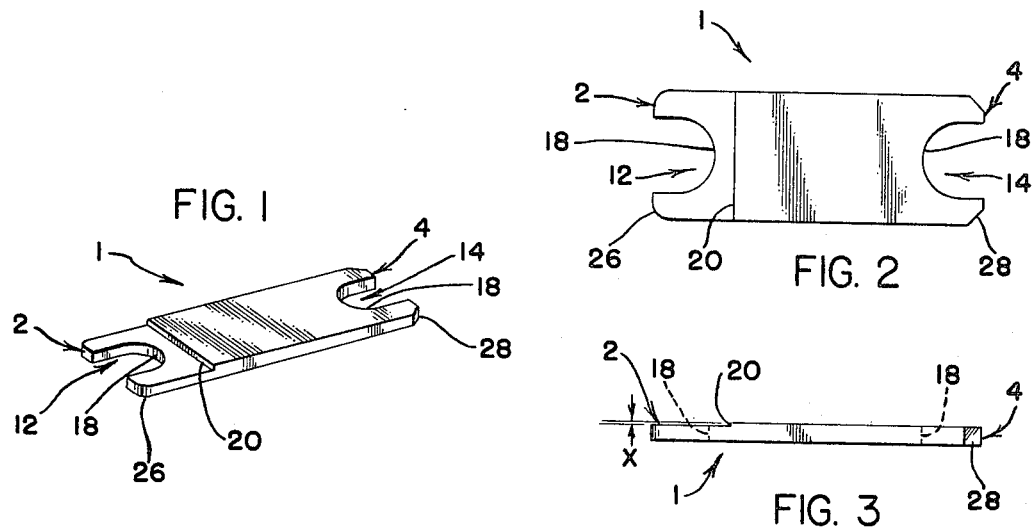
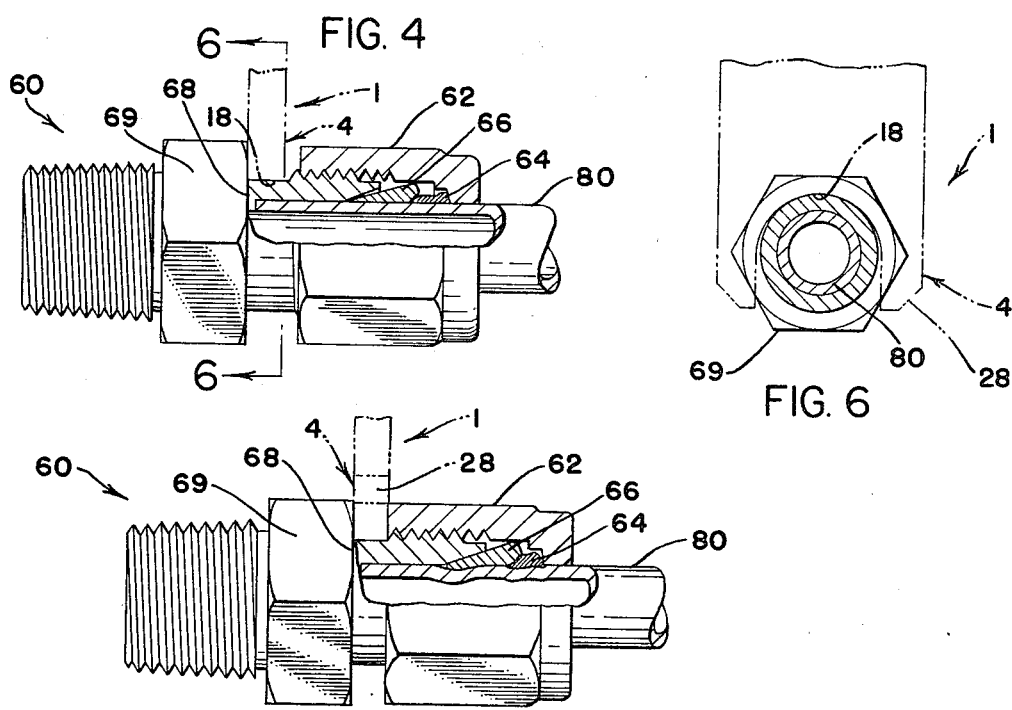
INVENTORS
FRED A. LENNON &
EMERY J. ZAHURANEC
BY
*Fay & Fay*
ATTORNEYS

United States Patent Office 3,287,813
Patented Nov. 29, 1966

3,287,813
GAUGE FOR COUPLING COMPONENTS
Fred A. Lennon, Chagrin Falls, and Emery J. Zahuranec, Bedford, Ohio, assignors to Crawford Fitting Company, Cleveland, Ohio, a corporation of Ohio
Filed Dec. 4, 1961, Ser. No. 156,780
6 Claims. (Cl. 33—168)

This invention relates to a "No-Go" gauge for determining the high pressure and low pressure relative axial positions of rotationally threaded coupling components for tube ends wherein a tapered sleeve or sleeves can be interposed between a coupling body and a nut, such that when the sleeve or sleeves are subjected to axial pressure a clinching grip is created upon the tube by means of a swaging action of the sleeve or sleeves upon the tube wall.

In its broadest sense the "No-Go" gauge comprises a generally rectangular body having bifurcated work engaging ends of a thickness differing by an amount dependent upon the number of threads per unit length and the number of rotations required for placing the coupling components in the proper high pressure and low pressure relative axial positions. It is designed for use during rotational assembly of the threaded components to insure accurate positioning without the necessity of counting the relative rotations of the components.

The novel gauge according to the principles of the invention is particularly adapted for use in connection with controlled phase sequential gripping devices of the type disclosed in U.S. patent application Serial No. 120,682, filed June 29, 1961, by Fred A. Lennon and Emery J. Zahuranec, and assigned to the same assignee as the instant application. The invention disclosed and claimed in that application includes an embodiment whereby the lead of the thread means on the tube coupling device is such that one and one-quarter turns from finger-tight relationship of the coupling nut and coupling body are required to advance the ferrule sufficiently to obtain optimum gripping and sealing for low and intermediate pressures, while one and one-half turns from finger-tight relationship proves particularly effective for pressures of somewhat higher order of magnitude. The length of the gap between the flange of the coupling body and the end of the coupling nut when the coupling components are in the low pressure application position is one of predetermined magnitude and when at the high pressure position is of a different magnitude and is accordingly indicative of the magnitude of the gripping forces applied to the tube.

The No-Go gauge of this invention is designed to facilitate the rotation of the coupling nut during assembly of the components to the proper predetermined position for high pressure and low pressure use, without the necessity of counting the relative rotations of the components. This, of course, is made possible by the novel relationship between the lead of the thread, the number of rotations required for high pressure positioning and the number of rotations required for low pressure positioning.

Normally the gripping devices, such as those with which the No-Go gauge of the invention is designed to be used, are shipped to the site in the assembled condition with the coupling nut in finger-tight threaded engagement on the body and with the front and the back ferrules aligned and clamped between the nut and the tapered mouth of the body. Since the component parts of the assembly are machined very accurately, this fingertight engagement positions the coupling components relatively axially in a predetermined relation such that in most instances the number of relative rotations necessary to move them to the point of final assembly on the tube is constant. However, it is still somewhat difficult to keep track of the number of rotations or fractions thereof necessary to position the components properly. Often the coupling parts are mounted in locations which provide only limited torquing tool clearance and many separate torquing operations may be required for one complete rotation.

With the foregoing problem in mind, it is an object of this invention to provide a No-Go gauge for determining the high pressure and low pressure relative axial positions of threaded coupling components without the necessity of counting the number of relative revolutions of the components during rotational assembly thereof.

It is a further object of the invention to provide a No-Go gauge for determining the high pressure and low pressure relative axial positions of rotationally threaded coupling components having dimensionally related work-engaging ends, one for high pressure positioning and one for low pressure positioning.

It is a still further and more specific object of the invention to provide a No-Go gauge for determining the high pressure and low pressure relative axial positions of rotationally threaded coupling components having bifurcated work-engaging ends of a thickness differing by a specified amount which is defined by the relationship between the number of rotations per unit length of the device and the difference of the number of rotations between the high pressure and the low pressure relative axial positions.

It is a further object of the invention to provide a No-Go gauge for determining the high pressure and low pressure relative axial positions of rotationally threaded coupling components comprising a generally rectangular body having the corners of one end angular and the corners of the opposite end curved for selection of the proper operating end by feeling the shape of the gauge corners.

In the drawings:

FIG. 1 is a perspective view of the No-Go gauge of the invention;

FIG. 2 is a top view of the No-Go gauge of the invention;

FIG. 3 is a side view of the No-Go gauge of the invention;

FIG. 4 is a view in phantom of the No-Go gauge in the "Go" position prior to relative axial positioning of the coupling body and the coupling nut;

FIG. 5 is a view in phantom of the No-Go gauge of the invention illustrating the "No-Go" position for the low pressure relative axial position of the coupling nut and coupling body; and FIG. 6 is a cross-sectional view along the line 6—6 of FIG. 4, illustrating the gauge in "Go" position prior to final relative axial positioning of the coupling nut and coupling body.

Describing now the figures of the drawings more particularly, wherein like parts are designated by like numerals in the several views:

The No-Go gauge of the invention is generally designated by the numeral 1 and comprises a generally rectangular body having bifurcated work engaging ends 2 and 4, respectively, defined by notches 12 and 14 having semi-circular work-engaging seats on their innermost surface, as shown at 18. The ends 2 and 4 of the gauge are of different thicknesses and a step 20 on one surface joins the thicker end 4 with the thinner end 2. Of course, it should be understood that the form of the gauge using the step 20 is a preferred embodiment since it is easily manufactured from flat stock. However, other more gradual intermediate portions connecting the thickened end 4 and the thin end 2 are possible. The height of the step 20 is designated by the letter "X" in FIG. 3, and represents the difference in thickness between the end 4 and the end 2 of the gauge. This relationship is critical and is necessary to adapt the No-Go gauge to use for both high pressure and low pressure relative axial positioning of the coupling nut and coupling body. The difference in thickness "X" is expressed in units and is equal to the reciprocal of the number of rotations per unit length of the coupling members times the difference of the number of rotations for high pressure positioning on the coupling components and the number of rotations for low pressure positioning of the coupling components.

The outermost corners of the bifurcations as designated at 26 and 28 are provided with indicia for indicating to the touch the proper end of the gauge for low pressure positioning or high pressure positioning of the coupling nut and coupling body. The indicia is best provided by a curving of the corners on the high pressure or thinner end and an angling of the ends on the thicker or low pressure end 4, since the thinner end is more liable to be sharp and cause damage to pockets and other objects with which it comes in contact.

The gauge is preferably provided of suitably rigid material, such as steel stock, and plated or otherwise coated to provide esthetic appeal and make it resistant to corrosion. All sharp corners and edges are beveled slightly so as not to vary the dimensions of the gauge substantially but to eliminate danger of cutting or scratching the operator during use. In its commercial form the gauge contains writing indicating the particular series of coupling assemblies with which it is to be used and any other information, such as advertising, and indication of which end is to be used for high pressure service and which end for low pressure service.

The gauge is designed with the novel relationship in thickness difference between the ends to be used with all fittings having the same thread lead. It should be noted at this point that whether single threads or multiple threads are used is not critical since it is the axial advance per rotation of the thread which controls the particular gauge to be used. FIGS. 4 through 6 illustrate a typical application of the gauge. A coupling body 60 and coupling nut 62 are provided in fingertight assembled relation with a tube 80. Within the coupling nut and axially positioned relative to the coupling body 60 are two ferrules, a rear ferrule 64 and a front ferrule 66. Upon relative rotation of the coupling body 60 and the coupling nut 62, the generally tapered shape of ferrules 64 and 66 cause a sequential inward gripping of the tube 80 as explained in detail in the above mentioned application of Fred A. Lennon and Emery J. Zahuranec, U.S. Serial No. 120,682, filed June 29, 1961, and assigned to the same assignee. As therein disclosed, the assembly is shipped to the user in fingertight relation and when used it is slipped onto the tubing until the tube abuts against an inner seat 68 in the coupling body.

Upon positioning of the gauge between the torquing flange of the coupling body and the end of the coupling nut 62 when the assembly is in this fingertight relationship, the gauge and assembly will appear as shown in FIGS. 4 and 6. The coupling body 60 and the coupling nut 62 are then rotated relative to one another by means of a torquing tool, such as a wrench, on the flange 69 of the coupling body until the low pressure application position shown in FIG. 5 is reached. The No-Go gauge is then positioned adjacent the flange 69 and the coupling nut 62 to determine if the proper relative spacing is effected for the low pressure application. At this point, as will be seen in FIG. 5, the ferrules 64 and 66 have gripped the tubing 80 and provided an effective leaktight seal for most application. The gauge is necessary in that it has been found that a common cause of failure of the leaktight relation of the fitting and tube is overturning and resultant gouging and galling of the tubing. Since, in many applications, the torquing wrench must be applied and removed alternately and short torquing strokes taken to obtain the necessary turns, it is often difficult to keep track of the exact number of rotations of the parts relative to one another to establish the properly positioned relationship between the coupling nut 62 and the coupling body 60.

Where thick-walled stainless steel tubing is used in high pressure applications, the same procedure would be used with the gauge. However, the operator would feel the curve 26 and thereby determine the end of least thickness and turn down the coupling nut and coupling body relative to one another until the gauge is prevented from entering the space between the flange 69 on the coupling body and the coupling nut 62. At this point, the proper gripping relation of the ferrules and the tube is effected and the leaktight seal completed without the operator having had to count the relative rotations of the components during the rotational assembly.

For ease of description, the principles of the invention have been set forth in connection with but a single illustrated embodiment but it is not our intention that the illustrated embodiment or the terminology employed in describing it be limiting inasmuch as variations from these may be made without departing from the spirit of the invention. Rather we desire to be restricted only by the scope of the appended claims.

The invention claimed is:

1. A No-Go gauge for determining the high pressure and low pressure relative axial positions of rotationally threaded coupling components comprising a generally rectangular body having bifucated work engaging ends of a thickness differing by an amount expressed in units which is equal to the reciprocal of the number of rotations per unit length times the difference of the number of rotations for high pressure positioning and the number of rotations for low pressure positioning, whereby the relative axial positions of the rotationally threaded coupling components for both high pressure and low pressure use can be determined accurately by the gauge without counting the relative rotations of the components during rotational assembly of the threaded components.

2. A No-Go gauge for determining the high pressure and low pressure relative axial positions of rotationally threaded coupling components comprising a generally rectangular body having bifurcated work engaging ends of a thickness differing by an amount expressed in units which is equal to $$\frac{1}{\text{number of rotations per unit length}} \times \left(\begin{array}{c}\text{number of rotations for high pressure positioning} - \\ \text{number of rotations for low pressure positioning}\end{array}\right)$$

whereby the relative axial positions of the rotationally threaded coupling components for both high pressure and low pressure use can be accurately determined by the gauge without counting the relative rotations of the components during rotational assembly of the threaded components.

3. A No-Go gauge for determining the high pressure and low pressure relative axial positions of rotationally threaded coupling components comprising a generally rectangular body having bifurcated work engaging ends of a thickness differing by an amount expressed in units which is defined by the relationship $$X = \frac{1}{r}(n - n')$$

where $r$ is the number of rotations per unit length, $n$ is the number of rotations for high pressure positioning, and $n'$ is the number of rotations for low pressure positioning, whereby the relative axial positions of the rotationally threaded coupling components for both high pressure and low pressure use can be accurately determined by the gauge without counting the relative rotations of the components during rotational assembly of the threaded components.

4. The structure of claim 3 in which the corners of one end of the generally rectangular body are angular and the corners of the opposite end of the body are curved.

5. The structure of claim 3 in which the top and bottom surfaces of the intermediate end portions of the generally rectangular body are parallel and one of said surfaces has a step of a dimension equal to X.

6. A No-Go gauge for determining the high pressure and low pressure relative axial positions of rotationally threaded coupling components comprising a unitary elongated rectangular body having two bifurcated work engaging No-Go ends of overall gauging thickness differing by an amount expressed in units which is equal to the reciprocal of the number of rotations per unit length times the difference of the number of rotations for high pressure positioning and the number of rotations for low pressure positioning, whereby the relative axial positions of the rotationally threaded coupling components for both high pressure and low pressure use can be determined accurately by the gauge without counting the relative rotations of the components during rotational assembly of the threaded components.

References Cited by the Examiner

UNITED STATES PATENTS

| | | | |
|---|---|---|---|
| 1,983,279 | 12/1934 | Fletcher | 33—199 X |
| 2,375,945 | 5/1945 | Redmer | 33—178 |
| 2,664,638 | 1/1954 | Storey | 33—168 |
| 2,831,257 | 4/1958 | Aller. | |
| 2,837,828 | 6/1958 | Cybulski | 33—168 |

OTHER REFERENCES

Gages, Gaging and Inspection, first ed., The Industrial Press, New York, 1918; page 118.

LEONARD FORMAN, *Primary Examiner.*

ISAAC LISANN, ROBERT L. EVANS, *Examiners.*

C. T. WOOD, N. MARTIN, SAMUEL S. MATTHEWS,
*Assistant Examiners.*